US012291845B2

(12) United States Patent
Rhyner et al.

(10) Patent No.: US 12,291,845 B2
(45) Date of Patent: May 6, 2025

(54) VEHICLE CONTROL SYSTEM AND MODULE

(71) Applicant: Eddy Pump Corporation, El Cajon, CA (US)

(72) Inventors: Phillip Rhyner, San Diego, CA (US); Thomas Burrow, San Diego, CA (US); Robert Gonzalez, Chula Vista, CA (US)

(73) Assignee: Eddy Pump Corporation

( * ) Notice: Subject to any disclaimer, the term of this patent is extended or adjusted under 35 U.S.C. 154(b) by 158 days.

(21) Appl. No.: 17/889,094

(22) Filed: Aug. 16, 2022

(65) Prior Publication Data

US 2023/0055702 A1   Feb. 23, 2023

Related U.S. Application Data (60) Provisional application No. 63/233,927, filed on Aug. 17, 2021.

(51) Int. Cl.
| | |
|---|---|
| *E02F 9/20* | (2006.01) |
| *E02F 9/26* | (2006.01) |
| *G05D 1/00* | (2024.01) |

(52) U.S. Cl.
CPC ............ *E02F 9/2004* (2013.01); *E02F 9/205* (2013.01); *E02F 9/2054* (2013.01); *E02F 9/264* (2013.01); *G05D 1/0016* (2013.01); *G05D 1/0027* (2013.01); *G05D 1/0278* (2013.01)

(58) Field of Classification Search
CPC ....... E02F 9/2004; E02F 9/205; E02F 9/2054; E02F 9/264; E02F 3/8825; E02F 9/265; G05D 1/0016; G05D 1/0027; G05D 1/0278; G05D 3/20
See application file for complete search history.

(56) References Cited

U.S. PATENT DOCUMENTS

| | | | |
|---|---|---|---|
| 8,078,297 B2 * | 12/2011 | Lasher | G05B 19/0426 172/779 |
| 2003/0147727 A1 * | 8/2003 | Fujishima | H04Q 9/10 414/200 |
| 2009/0144027 A1 * | 6/2009 | Mindeman | G05B 19/042 702/183 |

(Continued)

OTHER PUBLICATIONS

International Search Report and Written Opinion issued Feb. 9, 2023 in corresponding International Application No. PCT/US22/40486.

*Primary Examiner* — Alan D Hutchinson
(74) *Attorney, Agent, or Firm* — JID Global IP Counselors, LLP (57) ABSTRACT

Vehicle control systems and modules are disclosed herein. In an embodiment, a vehicle control module includes a first module connector configured to connect to a vehicle in place of a vehicle input device configured to control an operational part of the vehicle, a second module connector configured to connect to the vehicle input device, and an electronic controller configured to (i) receive an input command regarding the operational part of the vehicle from the vehicle input device connected via the second module connector, (ii) modify the input command, and (iii) transmit the modified input command to the vehicle via the first module connector to cause the vehicle to operate the operational part in accordance with the modified input command.

20 Claims, 5 Drawing Sheets

(56) References Cited

U.S. PATENT DOCUMENTS

2015/0371464 A1 12/2015 Fujimori et al.
2017/0168501 A1 6/2017 Ogura et al.
2018/0106014 A1 4/2018 Hortsman et al.

* cited by examiner

VEHICLE CONTROL SYSTEM AND MODULE

CROSS-REFERENCE TO RELATED APPLICATION

This application claims priority to U.S. Provisional Application No. 63/233,927, filed Aug. 17, 2021, the contents of which are hereby incorporated by reference.

BACKGROUND

Field of the Invention

The present disclosure relates to a vehicle control system. More specifically, the present disclosure relates to a vehicle control module configured to modify control of an operational part of a vehicle to improve the precision of the operational part during use thereof.

Background Information

Real time kinematic (RTK) system positioning is generally based on at least two GPS receivers—a base receiver and one or more rover receivers. The base receiver takes measurements from satellites in view and then broadcasts them, together with its location, to the rover receiver(s). The rover receiver also collects measurements from the satellites in view and processes them with the base station data. The rover receiver then estimates its location using collected measurements and can estimate a more precise position based on data from the base station.

SUMMARY

The present disclosure relates to a vehicle control system having a vehicle control module that can serve as base, rover, or heading reference receiver and that is easily configured by the end user over an integrated webpage. In an embodiment, the vehicle control system uses an RTK system to enable the vehicle control module to control operation of an operational part of a vehicle so as to make an act performed by the operational part more precise.

In view of the state of the known technology, a first aspect of the present disclosure is to provide a vehicle control module. The vehicle control module includes a first module connector, a second module connector, and an electronic controller. The first module connector is configured to connect to a vehicle in place of a vehicle input device configured to control an operational part of the vehicle. The second module connector is configured to connect to the vehicle input device. The electronic controller is configured to (i) receive an input command regarding the operational part of the vehicle from the vehicle input device connected via the second module connector, (ii) modify the input command, and (iii) transmit the modified input command to the vehicle via the first module connector to cause the vehicle to operate the operational part in accordance with the modified input command.

A second aspect of the present disclosure is to provide another vehicle control module. The vehicle control module includes at least one module connector and an electronic controller. The at least one module connector configured to enable connection to a plurality of different vehicles. The electronic controller is configured to (i) identify a vehicle of the plurality of different vehicles upon connection of the vehicle to the at least one module connector, (ii) determine location of one or more sensor on the vehicle, (iii) receive sensor data from the one or more sensor, and (iv) control operation of an operational part of the vehicle using the sensor data and real time kinematic positioning data.

A third aspect of the present disclosure is to provide a vehicle control system. The vehicle control system includes a vehicle, a base station, and a vehicle control module. The vehicle includes an operational part and one or more sensor. The base station is configured to generate real time kinematic positioning data. The vehicle control module is configured to modify an operation of the operational part of the vehicle based on sensor data from the one or more sensor on the vehicle and the real time kinematic positioning data received from the base station.

As can be understood, embodiments of the present disclosure improve effective precision and operator ease of machine control for placement of most earth moving applications when aided with geographic information system (GIS) and pre-survey results to shape the intended bathymetry/topography.

BRIEF DESCRIPTION OF THE DRAWINGS

The invention will be explained in more detail hereinafter with reference to the drawings.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
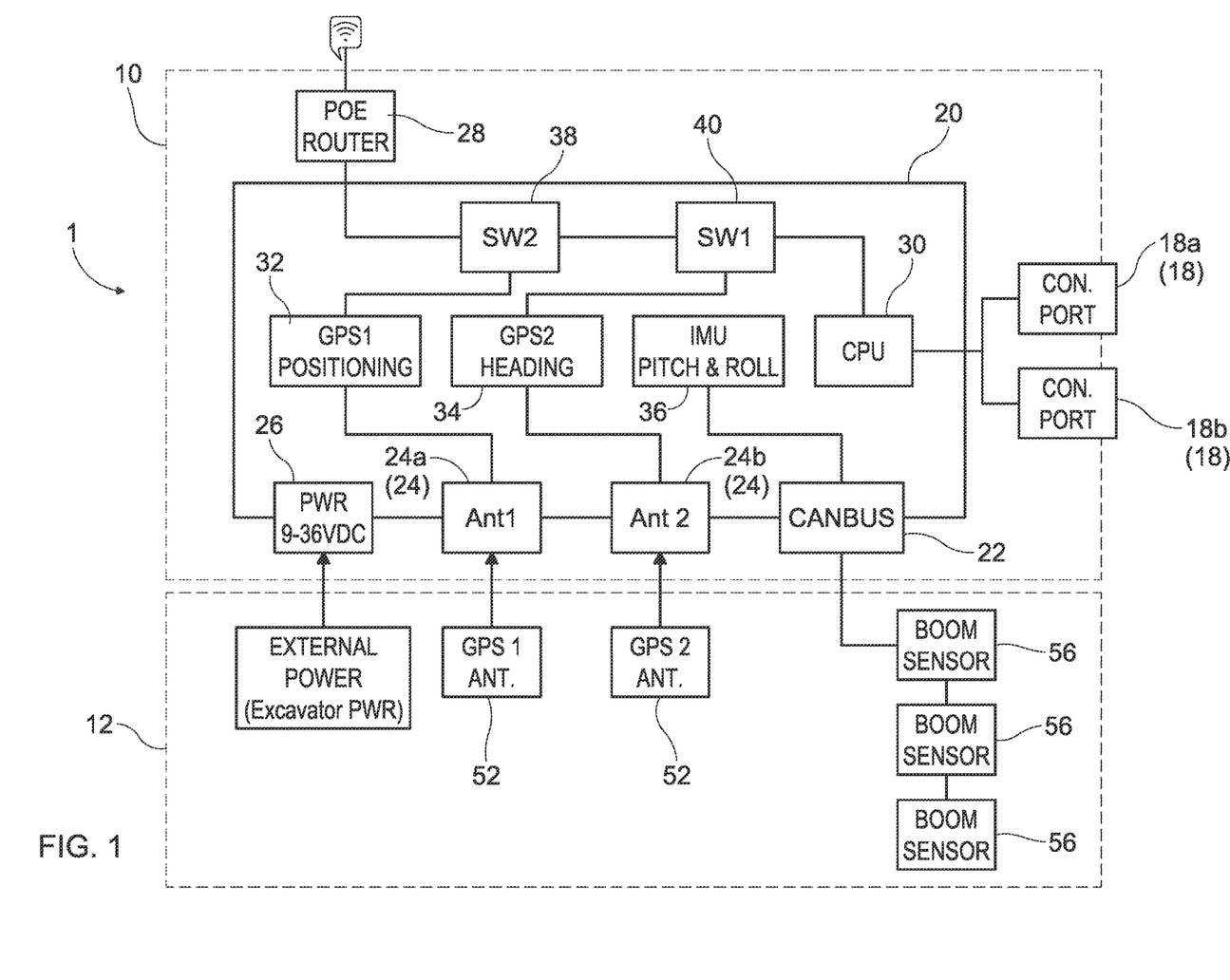
FIG. 1 illustrates an example embodiment of a vehicle control system in accordance with the present disclosure.
Figure 2:
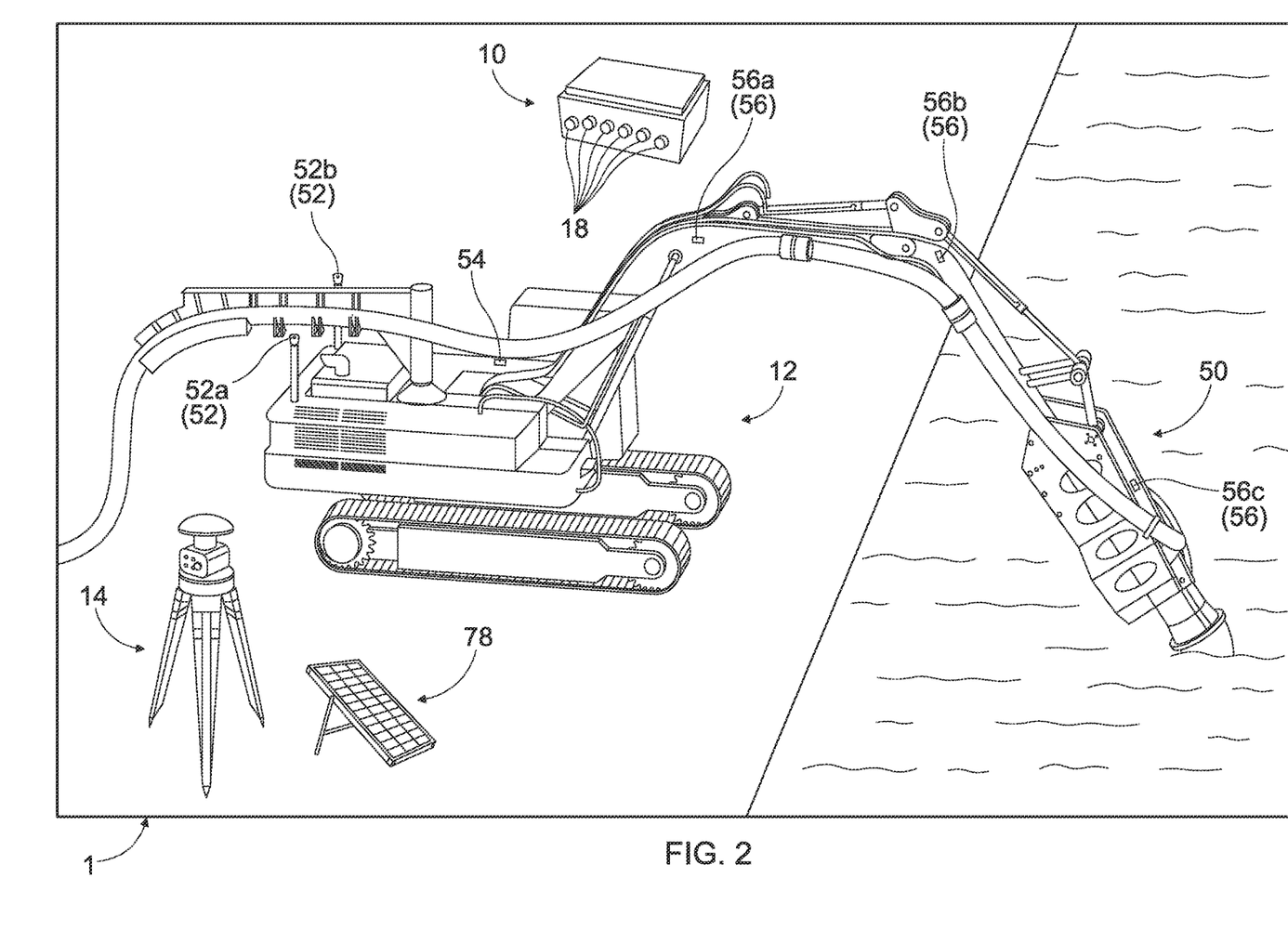
FIG. 2 further illustrates an example embodiment of a vehicle control system in accordance with the present disclosure.

FIGS. 1 and 2 illustrates an example embodiment of a vehicle control system 1 in accordance with a first embodiment of the present disclosure. In an embodiment, the vehicle control system 1 includes a vehicle control module 10 configured to operate in conjunction with a vehicle 12 and a base station 14, as seen for example in FIG. 2. The vehicle control module 10 is configured to use RTK controls with the base station 14 as a reference station to pinpoint the GPS coordinates of the vehicle 12 with precision. In the illustrated embodiment, the vehicle control module 10 is a standalone module configured to connect to and operate in conjunction with a variety of different types of vehicles 12. Alternatively, the vehicle control module 10 can include the vehicle 12 and/or the base station 14, or vice versa, for example, by incorporating the vehicle control module 10 into the vehicle 12 and/or the base station 14.

In the illustrated embodiment, the vehicle control module 10 is configured to connect to the vehicle 12 and adjust control of an operational part 50 of the vehicle 12. More specifically, the vehicle control module 10 is configured to modify an input command from a vehicle input device when controlling the operational part 50 of the vehicle 12 based on the input command. In doing so, the vehicle control module 10 improves the precision of the act performed by the operational part 50.

In the illustrated embodiment, the vehicle control module 10 includes at least one module connector 18, an electronic controller 20, a canbus 22, at least one antenna 24, a power source 26, and a wireless device 28. It should be understood by those of ordinary skill in the art that the vehicle control module 10 can include more or less elements than the illustrated embodiment, and that certain elements can be combined or separated into multiple elements.

The at least one module connector 18 is configured to enable the vehicle control module 10 to be operatively connected to at least one vehicle 12 so as to transmit data back and/or forth with the vehicle 12. More specifically, the module connector 18 is configured to enable the vehicle control module 10 to be operatively connected to a plurality of different vehicles 12.

In the illustrated embodiment, at least one module connector 18 includes a first module connector 18a and a second module connector 18b. The first module connector 18a is configured to connect to the vehicle 12 in place of, or in addition to, a vehicle input device. The vehicle input device can be, for example, the vehicle's joystick or other user input device that is used to control the operational part 50 of the vehicle 12. The second module connector 18b is configured to receive a vehicle input device. Thus, in an example embodiment, a user can remove the vehicle's joystick, connect the first module connector 18a with the port from which the joystick was removed, and then plug the joystick into the second module connector 18b to make the vehicle control module 10 an intermediary between the joystick and the vehicle 12. The vehicle control module 10 is configured to then receive an input command from the joystick and modify the input command when controlling the operational part 50 of the vehicle 12. More specifically, as described in more detail below, the electronic controller 20 is configured to receive an input command regarding the operational part 50 of the vehicle 12 from the vehicle input device connected via the second module connector 18b, modify the input command, and transmit the modified input command to the vehicle 12 via the first module connector 18a to cause the vehicle 12 to operate the operational part 50 in accordance with the modified input command. In an embodiment, the controller 20 is configured to modify the input command based on real time kinematic positioning data, as explained in more detail below. In an embodiment, the controller 20 is configured to modify the input command based on sensor data received from the vehicle 12 regarding the operational part 50, as explained in more detail below.

In an embodiment, a module connector 18 can include a USB port, coaxial cable port, or another type of port, for example, depending on one or more vehicle 12 that the vehicle control module 10 is intended to operate in conjunction with. In FIG. 1, the two module connectors are shown for simplicity. However, those of ordinary skill in the art will recognize from this disclosure that a single module connector 18 can be used or that at least one module connector 18 can also include more than two connectors 18, for example, as shown in FIG. 2.

The controller 20 preferably includes a microcomputer 30 with a control program that controls the vehicle control module 10. The controller 20 can also include other conventional components such as an input interface circuit, an output interface circuit, and storage devices such as a ROM (Read Only Memory) device and a RAM (Random Access Memory) device. In an embodiment, the microcomputer 30 is programmed to control the operational part 50 of the vehicle 12. In an embodiment, the microcomputer 30 is programmed to control the base station 14. In an embodiment, the controller 20 includes a memory circuit configured to store processing results and control programs such as ones for operation that are run by the processor circuit. The controller 20 is operatively coupled to the rest of the elements of the vehicle control module 10 in a conventional manner. The internal RAM of the controller 20 stores statuses of operational flags and various control data. The controller 20 is capable of selectively controlling any of the components of the vehicle control module 10 in accordance with the control program. It will be apparent to those skilled in the art from this disclosure that the precise structure and algorithms for the controller 20 can be any combination of hardware and software that will carry out the functions of the present invention.

In the illustrated embodiment, the controller 20 includes a GPS system including a positioning system 32, a heading system 34, and an angle determination system 36. The positioning system 32 is configured to determine a (IPS position (e.g., x, y and z coordinates) of the vehicle 14. In an embodiment, the positioning system 32 determines the position by processing GPS data. In the illustrated embodiment, the positioning system 32 receives GPS data via a first antenna 24a. The heading system 34 is configured to determine the compass direction that the vehicle 12 is facing. In an embodiment, the heading system 34 determines the direction by processing GPS data. In the illustrated embodiment, the heading system 34 receives the GPS data via a second antenna 24b. The angle determination system 36 is configured to determine the pitch angle, roll angle and/or yaw angle of the vehicle 12. In an embodiment, the angle determination system 36 can include or be in communication with an inertial measurement unit (IMU). In an embodiment, the IMU can be located at the vehicle 12 and can send data to the angle determination system 36 which can be processed to determine the pitch angle, roll angle and/or yaw angle of the vehicle 12. In the illustrated embodiment, the angle determination system 26 receives sensor data from the vehicle 12 via the canbus 24.

The controller 20 is configured to process the positional information from the vehicle positioning system 32, the heading information from the heading system 34, and the angle information from the angle determination system 36. In the illustrated embodiment, the microprocessor 30 is operatively connected to each of the positioning system 32, the heading system 34, and/or the angle determination system 36 via a first switch 36 and/or a second switch 38. The microprocessor 30 is also operatively connected to the router 28 via the first switch 38 and/or the second switch 40. The router 28 is configured to enable the vehicle control module 10 to wirelessly communicate data with an outside source. In an embodiment, the router 28 enables the vehicle control module 10 to wirelessly communicate with a vehicle 12 and/or a base station 14. In an embodiment, the router 28 enables the vehicle control module 10 to wirelessly communicate with a user's electronic device (e.g., personal computer, phone, etc.) to enable the user to set up and use the vehicle control module 10 to control an operation of the vehicle 12.

In the illustrated embodiment, the vehicle control module 10 includes a power source 26. The power source 26 can be an internal power source or an external power source. In an embodiment, the power source 26 includes a power port configured to receive power from the vehicle 12 to which the vehicle control module 10 is attached. In an embodiment, a module connector 18 enables the vehicle control module 10 to receive power from the vehicle 12 to which it is connected.

FIG. 2 illustrates an example embodiment of the vehicle control system 1 including the vehicle control module 10, a vehicle 12 and a base station 14. In the illustrated embodiment, the vehicle 12 is a construction vehicle. More specifically, in FIG. 2, the vehicle 12 is a dredger. The vehicle 12 can be, for example, a dredger, a crane, an excavator, or other earth grading heavy machinery which can be improved with precision provided by the vehicle control module 10 discussed herein. Although the vehicles 12 discussed herein are mobile vehicles 12, the vehicle 12 does not need to be mobile to take advantage of the improved control of the vehicle control module 10 discussed herein.

As illustrated, the vehicle 12 includes an operational part 50 that is controlled to perform an operation. A purpose of the vehicle 12 is to control the operational part 50 in a specific manner, for example, in an earth moving application. For example, with the dredger shown in FIG. 2, the operational part 50 is the dredge ladder which is controlled in a specific manner to dredge a specific location. In another example, the vehicle 12 is a crane and the crane's operational part 50 is a crane arm. In another example, the vehicle 12 is an excavator and the excavator's operational part 50 is an excavating arm. Those of ordinary skill in the art will recognize from this disclosure that the vehicle control module 10 disclosed herein is also advantageous for other types of vehicles 12 with other types of controllable operational parts 50.

In the illustrated embodiment, the vehicle control module 10 is a standalone module configured to be used interchangeably with a variety of vehicles 12. For example, the same vehicle control module 10 can be configured for use with more than one of an excavator, a crane, a dredger, or another vehicle having an operational part 50. In another example, the same vehicle control module 10 can be configured for use with different versions of the same type of vehicle 12 (e.g., a first excavator manufactured by a first company, a second excavator manufactured by a second company, etc.). The vehicle control module 10 disclosed herein is advantageous, for example, because it is designed to be interchangeable on a variety of different vehicles 12.

In use, the vehicle control module 10 uses RTK positioning to improve the precision of an operation performed by the operational part 50 of the vehicle 12. For example, in FIG. 2, the vehicle control module 10 is configured to use RTK positioning to ensure that the illustrated dredge ladder dredges at an appropriate depth and location. In doing so, the vehicle control module 10 uses RTK positioning based on a fixed base station 14 and a rover to reduce the rover's positional error. In an embodiment, the rover can be located on the vehicle 12 or the vehicle control module 10 so as to improve the positional error. In an embodiment, the rover can be located on the operational part 50 so as to improve the positional error of the operational part.

As seen in FIG. 2, in the illustrated embodiment, the vehicle 12 includes one or more antenna 52 (here, a first antenna 52a and a second antenna 52b), one or more receiver 54, and one or more sensor 56. In the illustrated embodiment, at least one sensor 56 is located at or near the operational part 50. Here, at least one sensor 56 includes a first boom sensor 56a, a second boom sensor 56b, and an attachment sensor 56c. The sensors 56 on the vehicle 12 can be any suitable sensors, such as a boom sensor 56a, 56b or a plurality of boom sensors 56a, 56b configured to determine a position or angle of the boom and/or an attachment sensor 56c to determine parameters of the attachment for dredging. For example, in the illustrated embodiment, the attachment sensor 56c monitors the dredge equipment and bathymetric productivity monitoring and logging. The sensors 56 can be preinstalled on the vehicle 12 prior to connection to the vehicle control module 10. Alternatively, the sensors 56 can be added to the vehicle 12. In an embodiment, the vehicle control module 10 is preprogrammed to know the location of the sensors 56 on the vehicle 12. More specifically, the vehicle control module 10 is preprogrammed to know the location of the sensors 56 on the operational part 50 of the vehicle 12.

In an embodiment, the vehicle 12 can include one or more of the elements discussed herein for the vehicle control module 10. For example, the vehicle 12 can include a plurality of GPS devices, an IMU device, an electronic controller, a router and a plurality of sensors 56. The GPS devices can determine the positioning of the vehicle 12 and the heading of the vehicle 12, while the IMU can determine the pitch and roll of the vehicle 12, and the plurality of sensors 56 can detect a parameter of the vehicle 12. Alternatively, additional GPS receivers can be added to either aid or replace additional sensors 56 to determine pitch and roll.

As with the controller 20, the controller on the vehicle 12 preferably includes a microcomputer with a control program that controls operation of the vehicle 12. The controller can also include other conventional components such as an input interface circuit, an output interface circuit, and storage devices such as a ROM (Read Only Memory) device and a RAM (Random Access Memory) device. In an embodiment, the microcomputer is programmed to control the operational part 50 of the vehicle 12. In an embodiment, the controller includes a memory circuit configured to store processing results and control programs such as ones for operation that are run by the processor circuit. The controller is operatively coupled to the rest of the elements of the vehicle 12 in a conventional manner. The internal RAM of the controller stores statuses of operational flags and various control data. The controller is capable of selectively controlling any of the components of the vehicle 12 in accordance with the control program. It will be apparent to those skilled in the art from this disclosure that the precise structure and algorithms for the controller can be any combination of hardware and software that will carry out the functions of the present invention. In use, the controller 20 of the vehicle control module 10 sends modified control instructions to the controller of the vehicle 12 to modify control of the operational part 50 by the controller of the vehicle 12.

Figure 3:
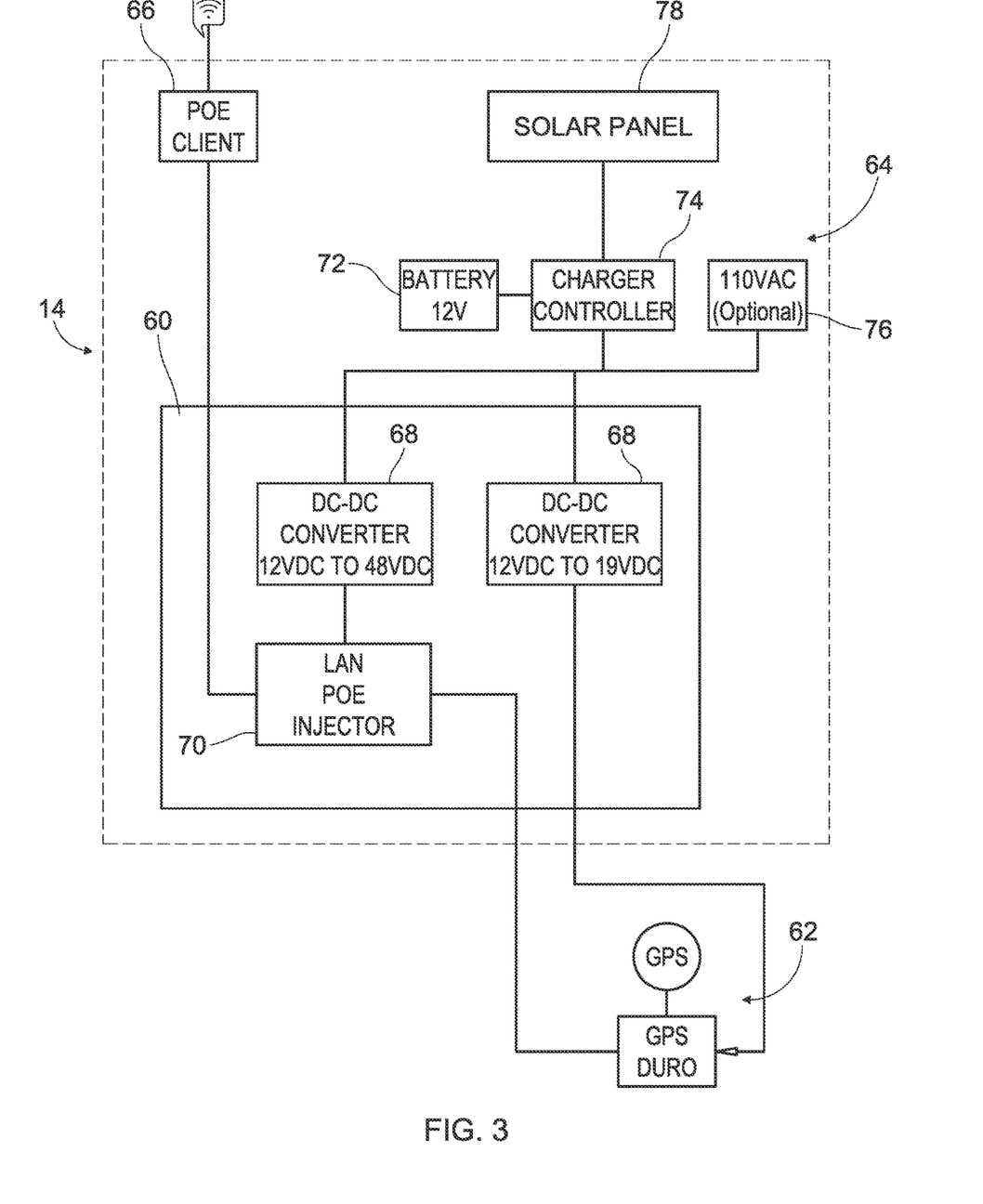
FIG. 3 illustrates an example embodiment of a base station in accordance with the present disclosure.

FIG. 3 illustrates an example embodiment of a base station 14. In the illustrated embodiment, the base station 14 includes an electronic controller 60, a positioning system 62, a power system 64, and a power over ethernet system 66. It should be understood by those of ordinary skill in the art that the base station 14 can include more or less elements than the illustrated embodiment, and that certain elements can be combined or separated into multiple elements. Those of ordinary skill in the art should recognize from this disclosure how a base station 14 can be used in accordance with generating accurate RTK positioning data for the vehicle control module 10.

In the illustrated embodiment, the controller 60 includes a plurality of DC-DC converters (e.g., two converters) 68. In an embodiment, one converter 68 can convert 12 VDC to 48 VDC and the other can convert 12 VDC to 19 VDC. It should be understood by those of ordinary skill in the art that the base station 14 can include any number and type of suitable converters 68 and is not limited to the embodiments described herein.

In the illustrated embodiment, the controller 60 includes a LAN POE injector 70 that is connected to the POE system 66. As can be understood, the POE injector 70 connects the PoE-enabled network device to a non-PoE LAN switch port. Using a PoE injector 70 avoids the need to run AC power lines for the wireless access point, because the existing LAN cabling can deliver both DC power as well as data.

The controller 60 preferably includes a microcomputer with a control program that controls the base station 14 as discussed herein. The controller 60 can also include other conventional components such as an input interface circuit, an output interface circuit, and storage devices such as a ROM (Read Only Memory) device and a RAM (Random Access Memory) device. The microcomputer of the controller 60 is programmed to control the base station 14. The memory circuit stores processing results and control programs such as ones for operation that are run by the processor circuit. The controller 60 is operatively coupled to the positioning system 62 and the power system 64 in a conventional manner. The internal RAM of the controller 60 stores statuses of operational flags and various control data the controller is capable of selectively controlling any of the components of the control system in accordance with the control program. It will be apparent to those skilled in the art from this disclosure that the precise structure and algorithms for the controller can be any combination of hardware and software that will carry out the functions of the present invention.

In an embodiment, the controller 60 can be integral to the commercial off the shelf (COTS) UPS system. Though it is open to the end user, this system does not necessarily need a dedicated controller separate from the GPS requirements for RTK function.

In the illustrated embodiment, the base station 14 includes a positioning system 62. The positioning system 62 can include a GPS system. In an embodiment, the base station 14 receives a GPS satellite signal, and the positioning system 62 processes the UPS satellite signal to determine positional information of the base station 14. The positioning system 62 is in communication with the controller 60, and is capable of transmitting such positional information regarding the base station 14 to the controller 60. The positional information is then used in RTK processing to enable the vehicle control module 10 to improve the precision of the operational part 50 of the vehicle 12.

In the illustrated embodiment, the base station 14 includes a power system 64. The power system 64 powers the controller 60. In an embodiment, the power system 64 includes a solar power system that includes a battery 72, a charger controller 74, a 110 VAC 76, and a solar panel 78. As can be understood by those of ordinary skill in the art from this disclosure, the power system 66 can be any suitable power system not linked to a solar power system or the solar power system described herein.

Figure 4:
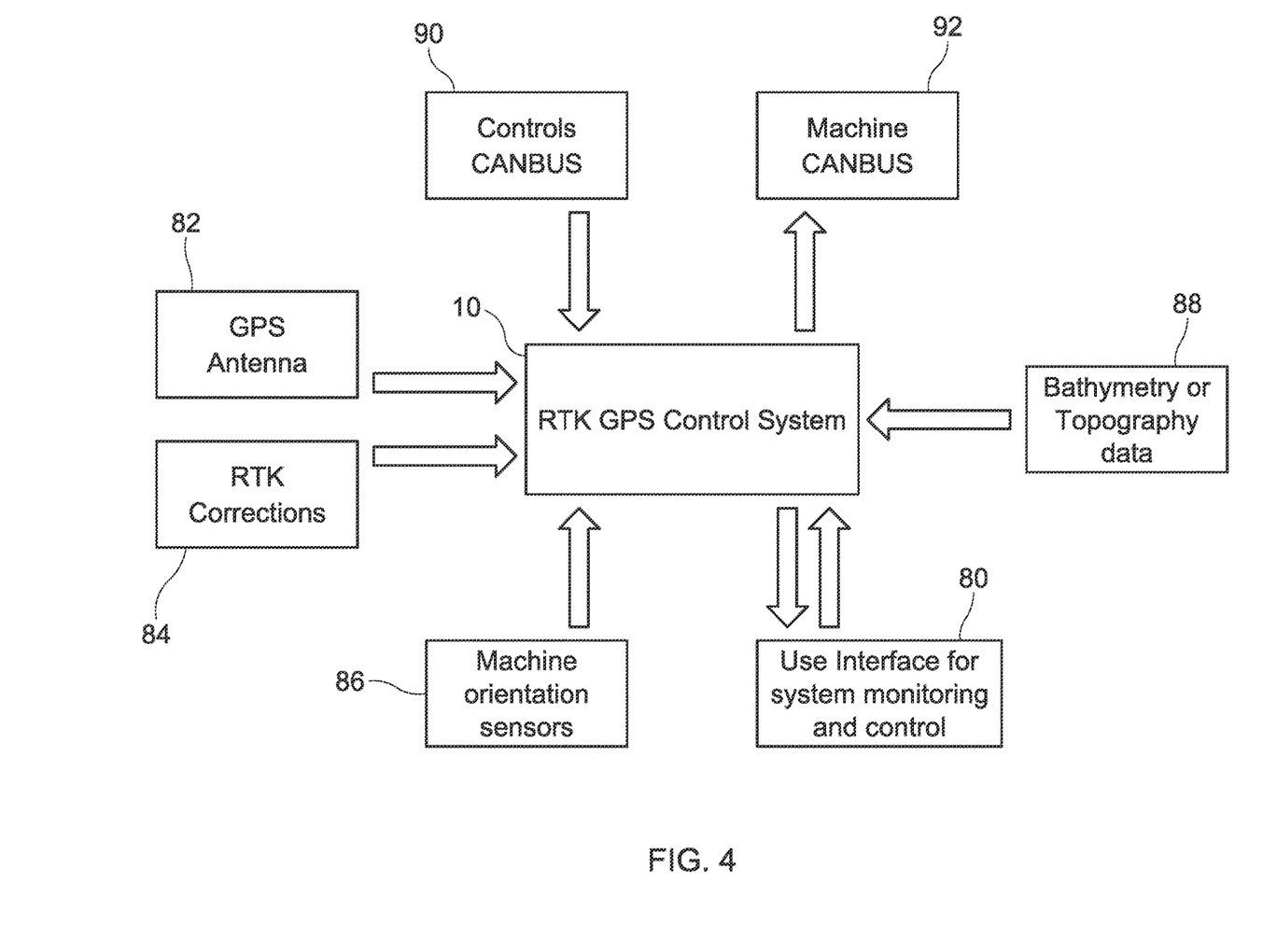
FIG. 4 illustrates an example schematic drawing showing use of a vehicle control module in accordance with the present disclosure.

FIG. 4 illustrates an example schematic diagram of a vehicle control module 10 receiving data from the vehicle 12 and/or the base station 14. In the illustrated embodiment, the vehicle control module 10 includes or is in communication with a user interface 80. The vehicle control module 10 is configured to receive data based on a user's input on the user interface 80, process the data via the controller 20, and send data back to the user interface 80 for updating the user interface display. In an embodiment, the data input by the user includes a selection of a type of vehicle 12 being connected to the vehicle control module 10. In an embodiment, the user interface 80 is configured to render machine visualizations animated based on a parameter detected from a sensor 56 and the position of the vehicle 12 based on the determination of the vehicle control module 10.

In an embodiment, the user interface 80 is located on a user's mobile phone, personal computer, or other computing device, which can communicate with the vehicle control module 10 via the router 28. In an embodiment, the user interface 80 is configured to enable application selection and device settings to be accessible via a user interface configuration page over ethernet, integrated WiFi, or CANbus. Once the application has been selected by the user, the settings for that application become available via the user interface 80. In an embodiment, all setup can be configured through the device's webpage. For factory testing and advanced troubleshooting, a deeper level of communications and configurations can be accessible over a USB port located on the vehicle control module 10.

In an embodiment, the controller 20 is in communication with the user interface 80, which is configured to enable a user to select the vehicle 12 from a plurality of different vehicles 12. In another embodiment, the controller 20 is configured to automatically recognize the vehicle 12 from a plurality of different vehicles 12 upon connection to the vehicle 12 via a module connector 18. In an embodiment, the plurality of different vehicles 12 include a plurality of excavators, cranes or dredges as described herein. In an embodiment, the plurality of different vehicles 12 include different vehicles 12 having different operational parts 50 as described herein. In an embodiment, the plurality of different vehicles 12 include different but similar vehicles 12 having a same operational part 50 as described herein.

In the illustrated embodiment, the vehicle control module 10 receives GPS antenna data 82. The UPS antenna data 82 can include the positional information received from the vehicle 12 and processed as illustrated with respect to FIG. 1 above. In an embodiment, the GPS antenna data 82 is transmitted as low frequency radio data. In an embodiment, the GPS antenna data 82 includes the phase difference of multiple frequencies (e.g., channels), for example, L1 and L2 frequencies which arrive at the receiver in slightly different phases than when leaving a satellite.

In the illustrated embodiment, the vehicle control module 10 receives RTK correction data 84. The RTK correction data 84 can be received from the base station 14. The control module 10 is configured to use the RTK correction data 84 to improve the precision of the operating part 50 of the vehicle as discussed herein. In an embodiment, the WM correction data 84 is of an RTCM protocol standard such as RTCM V3. In an embodiment, the RTK correction data includes a series of packets each intended for specific UTM time GPS data.

In the illustrated embodiment, the vehicle control module 10 receives machine orientation sensor data 86. The machine orientation sensor data 86 can include the heading information received from the vehicle 12 as illustrated with respect to FIG. 1 above. In an embodiment, the machine orientation sensor data 86 includes one or more of precision pitch, roll and/or heading derived from one or more of tri-axis magnetometer, tri-axis gryo rotational rate and/or tri-axis linear inertial sensors. In an embodiment, machine orientation sensor data 86 includes data from one or more MEMS type sensors or other 9DOF (nine degree of freedom) sensors that undergo advanced sensor fusion, for example, a highly tuned Kalman filter. In an embodiment, machine orientation sensor data 86 includes data from one or more A-IRS (attitude and heading reference system) or IMU (inertial measurement unit) sensors.

In the illustrated embodiment, the vehicle control module 10 receives bathymetry or topography data 88. The bathymetry data can include measurements of depth of water in oceans, seas, or lakes and is particularly useful, for example, for use with dredging equipment as illustrated in FIG. 2. The topography data can include measurements of forms and features of land surfaces. The vehicle control module 10 can receive the bathymetry or topography data, for example, from the vehicle 12, base station 14, and/or another source such as a GI'S satellite system. In an embodiment, the bathymetry or topography data 88 includes GIS data, for example, data regarding foundations, sewer, water supply, landscaping, or topography (if above the water)/bathymetry (if below the water). In an embodiment, the bathymetry or topography data 88 includes data regarding the shape of the earth either as-is or as intended to be modified.

In the illustrated embodiment, the vehicle control module 10 receives controls data 90. The controls data 90 can include, for example, input commands received from a vehicle input device connected to the vehicle control module 10 via a module connector 18 as discussed herein. Similarly, the vehicle control module 10 outputs machine data 92. The machine data 92 can include, for example, modified input commands that are based on input commands received from a vehicle input device as described herein. For example, the vehicle control module 10 can receive input commands from a vehicle input device, modify the input commands, and then transmit the modified input commands to the vehicle 12 for controlling the operational part 50 of the vehicle. More specifically, the vehicle control module 10 can receive input commands from a vehicle input device, modify the input commands based on the RTK correction data 84 and/or sensor data from the vehicle 12, and then transmit the modified input commands to the vehicle 12 for controlling the operational part 50 of the vehicle. More specifically, the vehicle control module 10 can modify the input commands to result in manipulation of the operational part 50 of the vehicle 12 to maintain intended grade by the vehicle control module 10 instead of manual control by the operator.

Figure 5:
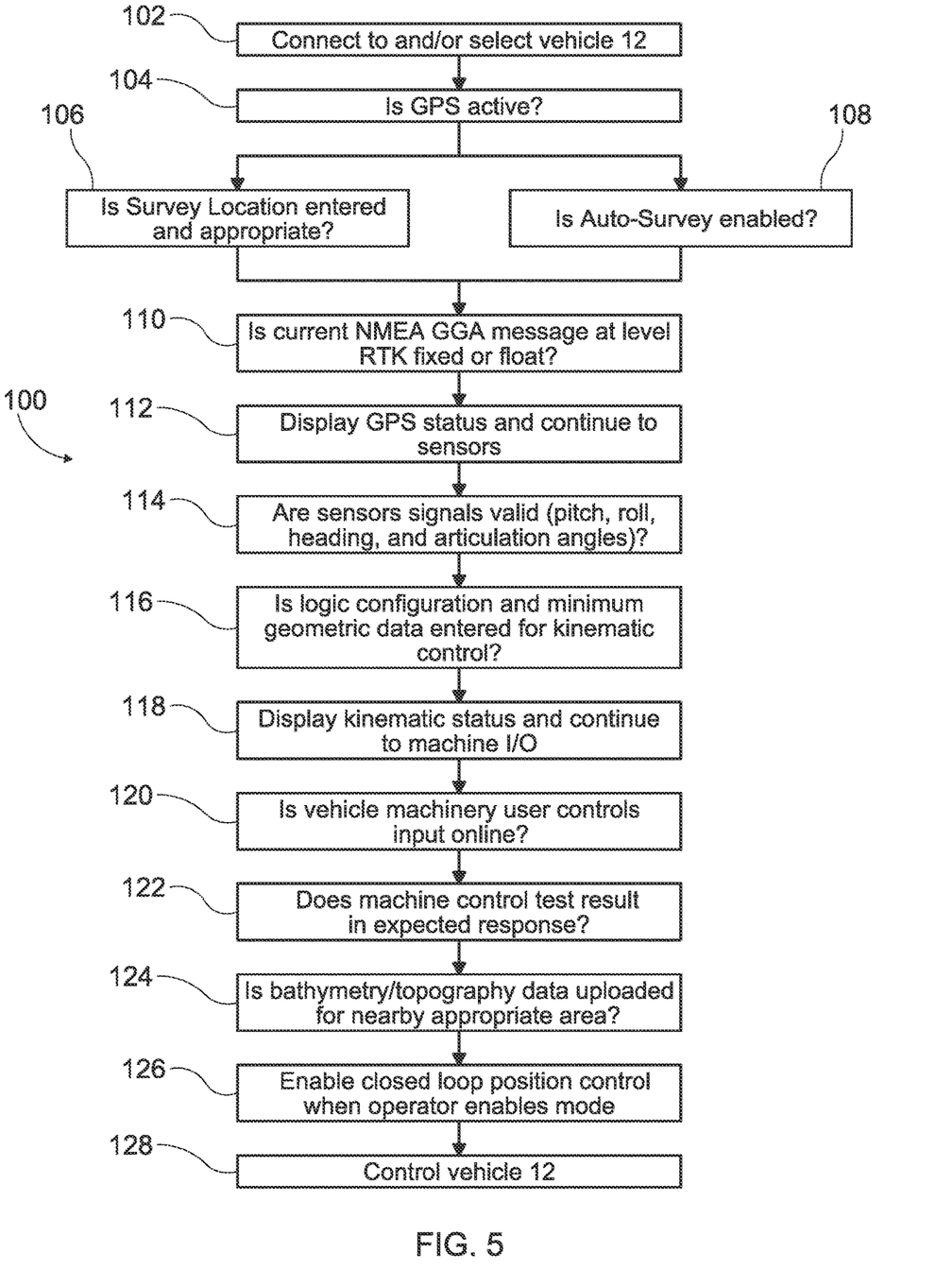
FIG. 5 illustrates an example method of operating a vehicle control module in accordance with the present disclosure.

FIG. 5 illustrates an example embodiment of a method 100 of operating a vehicle control module 10 in accordance with the present disclosure. The steps of the method 100 can be executed by one or more of the controllers discussed herein, for example, by being stored as instructions on its memory and executed by its processor. It should be understood that some of the steps described herein can be reordered or omitted without departing from the spirit or scope of the method 100.

In an embodiment, at step 102, a user connects a vehicle control module 10 to a vehicle 12. The user can connect the vehicle control module 10 to the vehicle 10, for example, via the module connector 18. In an embodiment, a user can remove the vehicle's 12 attached input device e.g., joystick, etc.), connect the first module connector 18a with the port from which the input device was removed, and then plug the input device into the second module connector 18b to make the vehicle control module 10 an intermediary between the input device and the vehicle 12. In another embodiment, the vehicle control module 10 can include or be operatively connected to its own vehicle input device rather than plugging in the removed input device. In another embodiment, the user interface 80 can act as an input device for the vehicle control module 10.

The user then accesses a user interface 80 for the vehicle control module 10 to select the type of vehicle 12 that the user has connected to the vehicle control module 10. In an embodiment, the user interface 80 presents a plurality of different vehicles for the user to choose from. The plurality of different types of vehicles 12 can be different types of vehicles that have their sensor location and/or control information already programmed into the vehicle control module 10. As discussed above, the plurality of different types of vehicles can be vehicles with different operations e.g., dredger, crane, excavator, etc.) or different types of vehicles with the same operation (e.g., a first excavator, a second excavator, etc.). Once the vehicle 12 has been selected, the vehicle control module 10 is programmed to know where the sensors 56 are located on that vehicle 12. More specifically, the vehicle control module 10 is programmed to know where the sensors 56 are located with respect to the operational part 50 of that vehicle 12.

In another embodiment, the vehicle control module 10 automatically detects the type of vehicle 12 that it is connected to upon the connection being made. In an embodiment, the user can then verify the type of vehicle 12 via the user interface 80.

At step 104, the controller 20 determines whether UPS is active. More specifically, the controller 20 determines whether GPS is in RTK corrected mode. In an embodiment, the controller 20 determines whether UPS is active by monitoring the relevant data field of the NMEA string which indicates if the data is ether RTK Fixed, or RTK Float. In an embodiment, a UPS receiver handles all the processing to determine its precision level and if it is to the RTK standard. In an embodiment, the NMEA data field is GPS Fix Type, of with a result of 4 or 5 would be RTK Fixed or RTK Float, respectively. In an embodiment, the NMEA data field HDOP (horizontal dilution of precision). If the controller 20 determines the GPS to be active, the method proceeds to step 104 or step 106. If the controller 20 determines the GPS not to be active, the controller 20 causes the user interface 80 to report this deficiency and/or takes corrective action.

At step 106, the controller 20 determines whether the survey location is entered and/or appropriate. In another embodiment, a user can enter the survey location via the user interface 80. In another embodiment, the controller 20 enters or approximates the survey location based on detected UPS data and asks the user to confirm or adjust via the user interface 80. In an embodiment, the controller 20 can determine whether the survey location is appropriate, for example, by comparing the survey location to GPS data, bathometry, or topography data. In an embodiment, if a CRS fix results in a position that deviates from the intended bathymetry/topography more than a configured amount (e.g., varies by vehicle type and application), the controller 20 determines that there is an error instead of going into auto control mode (e.g., PID closed loop control). If the controller 20 determines the survey location not to be appropriate, the controller 20 causes the user interface 80 to report this deficiency and/or takes corrective action.

Alternatively or additionally, the controller 20 at step 108 can determine whether auto-survey is enabled. If auto-survey is enabled, the controller 20 automatically enters the survey location based on detected UPS data without input from the user. In an embodiment, the controller 20 averages all received uncorrected positions over a period of time (e.g., a few minutes) and results in a position close to a properly surveyed result (e.g., within inches). In an embodiment, the controller 20 further determines if the survey location is appropriate, for example, by comparing the survey location to GPS data, bathometry, or topography data. If the controller 20 determines the survey location not to be appropriate, the controller 20 causes the user interface 80 to report this deficiency and/or takes corrective action.

At step 110, the controller determines whether a current NMEA GGA message is at level RTK Fixed or Float. In an embodiment, the controller 20 determines whether NMEA fix type is 4 or 5. In an embodiment, the controller 20 monitors the relevant data field of an NMEA string which indicates if the data is ether RTK. Fixed, or RTK Float. In an embodiment, the NMEA data field is GPS Fix Type, of with a result of 4 or 5 would be RTK Fixed or RTK Float, respectively. In an embodiment, the NMEA data field MOP (horizontal dilution of precision).

At step 112, the controller 20 causes the user interface 80 to display the GPS status if the GPS is active. The controller 20 can display the GPS status, for example, using the GPS coordinates and/or a map of the area. In an embodiment, the controller 20 is configured to utilize third party software such as Google Maps API.

At step 114, the controller 20 determines whether sensor signals are valid (e.g., pitch, roll, heading, and articulation angles). In an embodiment, the controller 20 determines whether the sensor signals are valid by requesting and receiving expected sensor data from the sensors 56 of the vehicle 12. In an embodiment, the controller 20 requests the operator to do a series of movements (e.g., raise boom) and compares the movements to what would be expected of other elements (e.g., the boom, stick, and pump angle sensors all pitching back the same angle as they are all linked to each other). If any of the sensors 56 do not respond within a set tolerance of the others, or move in the wrong direction, the controller 20 can determine that that either the sensors 56 are misplaced or missing. If the controller 20 determines the sensor data to be valid, the controller 20 logs the sensor data. If the controller 20 does not determine the sensor data to be valid, the controller causes the user interface 80 to report this deficiency via the user interface 80 and/or takes corrective action.

At step 116, the controller 20 determines whether logic configuration and minimum geometric data is entered for kinematic control. In an embodiment, the minimum geometric data includes GIS data (e.g., intended bathymetry or topography) of high enough resolution and in the same area as the GPS fix. In an embodiment, if there is no GIS intended geometric data for where the operational part 50 of the vehicle 12 is, the controller 20 cannot automatically position because the confidence of where it should be is either too low or missing altogether.

At step 118, the controller 20 causes the user interface 80 to display the kinematic status and continue to machine I/O. More specifically, the controller 20 causes the user interface 80 to provide a visual aid to the operator that the vehicle 12 is in normal operation, (e.g., a button next to a label saying "RTK and GIS present, Perform Auto Grade?", a light next to an RTK label, a light next to a GIS label, a light next to a sensors label, etc.).

At step 120, the controller 20 determine whether the vehicle or machinery user controls input are online. The controller 20 can make this determination, for example, by transmitting data with a vehicle input device and/or vehicle via one or more module connector 18. In an embodiment, controller 20 provides a safety feature that the auto grade will be primarily used in a "user guided" mode, so if the controller 20 does not see machine positioning activity (not articulation movement activity, but user requested vehicle rotation or movement) the automatic grade following would stop. In an example embodiment, the controller 20 requires the operator to rotate the cab of the excavator, and while the operator is holding the joystick in the position to swing the cab, the controller 20 controls the boom, stick, and pump, and only when complete with that positions "cut" would it actually rotate and then stop again to do another cut. In this embodiment, the operator is only required to hold the joystick over signaling to the controller 20 that it should continue it progress.

At step 122, the controller 20 determines whether machine control test results in an expected response. More specifically, the controller 20 compares expected movements with intended movements. In an embodiment, the controller 20 performs a self-check in that if the machine logic is trying to lower the boom, but the controller 20 does not see the expected movement from the sensors 56, the controller 20 stops and reports an error.

At step 124, the controller 20 determines whether bathymetry/topography data is uploaded for the nearby appropriate area. If the controller 20 does not determine the bathymetry/topography data to have been uploaded for the nearby appropriate area, the controller 20 causes the user interface 80 to report this deficiency and/or takes corrective action.

At step 126, the controller 20 enables closed loop position control when an operator enables the mode. More specifically, in closed loop position control mode, the controller 20 automatically maintains grade. In an embodiment, a control screen gives the operator the control to continue into the full guidance mode. In an embodiment, the operator enables the mode via the user interface 80.

At step 128, the controller 20 controls the vehicle 12 in accordance with instructions from the user. More specifically, the controller 20 controls the operational part 50 of the vehicle 12 in accordance with instructions from the user. In an embodiment, the user has unplugged the input device (e.g., joystick) from the vehicle 12, plugged the input device into the vehicle control module 10, and plugged the vehicle control module 10 into the vehicle 12 where the input device originally plugged into. In this embodiment, the user can then use the vehicle input device and have the input commands modified by the vehicle control module 10. More specifically, the vehicle control module 10 modifies the input commands based on the RTK corrections data 82 to improve the precision of the operating part 50. In an embodiment, the vehicle control module 10 only modifies some of the input commands received from the input device, for example, the input commands that relate to the operating part 50. For example, in an embodiment with the vehicle 12 being an excavator, the user can use the input device (e.g., joystick) to move the excavator tracks and cab rotation without the commands being modified by the vehicle control module 10, while the operational part 50 commands (e.g., boom, stick, and bucket commands) that also come from the input device are now modified by the vehicle control module 10 and modified commands re-sent by the vehicle control module 10 to the vehicle 12. Of course, the vehicle control module 10 is designed for many more platforms than excavators, and can improve more functions than kinematic chains like in this example of boom, stick, and bucket.

In an embodiment, the vehicle control module 10 controls the vehicle 12 using a combination of kinematics and PID loops for each control movement (e.g., joystick axis) for intended movement.

In an embodiment, the controller 20 translates GPS coordinates and elevation to the operational part 50 of the vehicle 12 knowing vehicles pitch, roll, and heading, along with dimensions of translated points on the vehicle 12. The controller 20 can further translate the position through articulated members, such as the boom of an excavator, knowing the relative angle to the body of the vehicle 12 and assuming the heading and roll of the boom is the same as the vehicle 12. Over long distances, due to factors such as curvature of the earth, a haversine function is used to convert latitude/longitude coordinates to cartesian coordinates. In an embodiment, for example with a small reference such as an excavator, the controller 20 can use a simple conversion of latitude or longitude to meters (e.g., roughly 111,111 meters per degree of latitude and longitude).

In an embodiment, a vehicle control system 1 according to the present disclosure includes a positioning system configured to determine a position of a vehicle 12, a sensor configured detect a parameter of the vehicle 12, and an electronic controller configured to render machine visualizations animated based on the parameter detected from the sensor and the position of the vehicle 12 based on the determination of the vehicle control module 10.

In an embodiment, the vehicle control module 10 integrates multiple types of sensors for kinematic translation and performance improving EKF (extended Kalman filtering). In an embodiment, the vehicle control module 10 includes a multi sensor capable with ethernet, RS485, and CANbus sensors. In an embodiment, the vehicle control module 10 includes an integrated Linux operating system with web based (HTML5) Node-RED and GUI.

In an embodiment, communication between base and rover modules are over sub-GHz radio and/or Ethernet. In an embodiment, the base module will output the information over both interfaces without any need for setup.

In an embodiment, communication between rover and heading modules will be over Ethernet and the integrated In an embodiment, the heading modules output the information over both interfaces without any need for setup. If both interfaces are connected, then the rover module can use Ethernet as the primary connection with Wi-fi as a backup.

As can be understood, in an embodiment, the vehicle control module 10 can provide varying levels of improved machine control/automation and can tie the results of an algorithm of UPS and sensors and assists and operator with dredge grade control.

The embodiments described herein provide improved systems and methods for controlling operational parts 50 of vehicles 12. These systems and methods are advantageous, for example, because they improve the precision of the operational parts 50. It should be understood that various changes and modifications to the systems and methods described herein will be apparent to those skilled in the art and can be made without diminishing the intended advantages.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle control module comprising:
 a first module connector configured to connect to a vehicle in place of a vehicle input device configured to control an operational part of the vehicle having one or more sensor located thereon;
 a second module connector configured to connect to the vehicle input device;
 an electronic controller including at least one of a positioning system configured to determine a GPS position of the vehicle, a heading system configured to determine a compass direction of the vehicle, or an angle determination system configured to determine at least one of pitch angle, roll angle or yaw angle of the vehicle; and
 the electronic controller configured to (i) receive an input command regarding the operational part of the vehicle from the vehicle input device connected via the second module connector, (ii) modify the input command to maintain an intended grade by the operational part using at least real time kinematic correction data, the determination by at least one of the positioning system, the heading system or the angle determination system, and sensor data from the one or more sensor, and (iii) transmit the modified input command to the vehicle via the first module connector to cause the vehicle to operate the operational part in accordance with the modified input command to maintain the intended grade.

2. The vehicle control module of claim 1, wherein the vehicle input device includes a joystick.

3. The vehicle control module of claim 1, wherein the vehicle includes at least one of a dredger, a crane or excavator.

4. The vehicle control module of claim 1, wherein the electronic controller is in communication with a user interface configured to enable a user to select the vehicle from a plurality of different vehicles.

5. The vehicle control module of claim 1, wherein the electronic controller is configured to automatically recognize the vehicle from a plurality of different vehicles upon connection to the vehicle via the first module connector.

6. The vehicle control module of claim 1, comprising a CANbus configured to receive the sensor data from the one or more sensor located on the operational part of the vehicle.

7. The vehicle control module of claim 1, wherein the electronic controller is configured to enable an operator to control movement of a cab of the vehicle using the vehicle input device while maintaining the intended grade by the operational part using the at least real time kinematic correction data, the determination by at least one of the positioning system, the heading system or the angle determination system, and the sensor data from the one or more sensor.

8. The vehicle control module of claim 1, wherein the electronic controller includes each of the positioning system, the heading system, and the angle determination system.

9. A vehicle control module comprising:
at least one module connector configured to enable connection to a plurality of different vehicles;
an electronic controller configured to (i) store parameters related to locations of sensors on respective operational parts of the plurality of different vehicles; (ii) enable a user to select a vehicle of the plurality of different vehicles upon connection of the vehicle to the at least one module connector, (iii) upon selection of the vehicle by the user, determine locations of one or more sensor with respect to an operational part of the vehicle, (iv) receive sensor data from the one or more sensor on the operating part, and (v) control operation of the operational part of the vehicle using the locations of the one or more sensor, the sensor data and real time kinematic positioning data.

10. The vehicle control module of claim 9, wherein the plurality of different vehicles include a plurality of excavators, cranes or dredges.

11. The vehicle control module of claim 9, wherein the plurality of different vehicles include different vehicles having different operational parts.

12. The vehicle control module of claim 9, wherein the plurality of different vehicles include different vehicles having a same operational part.

13. The vehicle control module of claim 9, wherein the electronic controller is configured to receive the real time kinematic positioning data from a base station separate from the vehicle.

14. The vehicle control module of claim 9, wherein the electronic controller is in communication with a user interface receiver configured to receive a user's selection of the vehicle of the plurality of different vehicles.

15. The vehicle control module of claim 14, further comprising the user interface.

16. The vehicle control module of claim 9, wherein the electronic controller is configured to automatically identify the vehicle of the plurality of different vehicles upon connection of the vehicle to the module connector.

17. A vehicle control system comprising:
a vehicle including vehicle input device, a cab, an operational part and one or more sensor located on the operational part;
a base station configured to generate real time kinematic positioning data; and
a vehicle control module configured to enable an operator to control movement of the cab of the vehicle using the vehicle input device while modifying operation of the operational part of the vehicle based on sensor data from the one or more sensor on the operational part and the real time kinematic positioning data received from the base station.

18. The vehicle control system of claim 17, wherein the vehicle includes at least one of a dredger, a crane, excavator, or other earth grading heavy machinery.

19. The vehicle control system of claim 17, wherein the vehicle control module includes a first module connector configured to connect to the vehicle in place of the vehicle input device configured to control the operational part of the vehicle, a second module connector configured to connect to the vehicle input device, and an electronic controller configured to (i) receive an input command regarding the operational part of the vehicle from the vehicle input device connected via the second module connector, (ii) modify the input command based on the sensor data from the one or more sensor on the operational part and the real time kinematic positioning data received from the base station, and (iii) transmit the modified input command to the vehicle via the first module connector to cause the vehicle to operate the operational part in accordance with the modified input command.

20. The vehicle control system of claim 17, wherein the vehicle control module is in communication with a user interface configured to enable a user to identify the vehicle from a plurality of different vehicles.

* * * * *